May 7, 1957  A. B. ASH ET AL  2,791,551
REMOVAL OF HNO₃ FROM CARBOXYMETHYL DIETHERS
OF ETHYLENE GLYCOLS
Filed May 1, 1952  2 Sheets-Sheet 1

Arthur B. Ash
Mason H. Earing
INVENTORS

BY *Richard L. Kelly*
Attorney

Arthur B. Ash
Mason H. Earing
INVENTORS

United States Patent Office 2,791,551
Patented May 7, 1957

2,791,551

REMOVAL OF HNO₃ FROM CARBOXYMETHYL DIETHERS OF ETHYLENE GLYCOLS

Arthur B. Ash, Wyandotte, and Mason H. Earing, Lincoln Park, Mich., assignors to Wyandotte Chemicals Corporation, Wyandotte, Mich., a corporation of Michigan Application May 1, 1952, Serial No. 285,462

2 Claims. (Cl. 202—52)

The present invention relates to a process for separating nitric acid from a mixture of nitric acid and a carboxymethyl diether of an ethylene glycol. The term "ethylene glycol" is used herein in a generic sense and includes within its meaning both monoethylene glycol and polyethylene glycols.

The carboxymethyl diether of ethylene glycol (alternatively ethylene bisglycollic acid) and the carboxymethyl diether of polyoxyethylene glycols can be prepared by the nitric acid oxidation of polyoxyethylene glycols according to the equation:

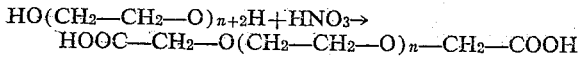

In carrying out the above described oxidation, an excess of nitric acid is employed and the crude reaction product contains nitric acid in admixture with the desired carboxymethyl diether.

The obvious method to remove the nitric acid from the desired carboxymethyl diether is distillation, however, conventional distillation procedures are highly inefficient. Since nitric acid is a strong oxidizing agent, it is apparent that the pot temperature at which such a distillation can be run will be severely limited; in practice this limit is usually less than about 60° C. Since the maximum pot temperature is set, the distillation must be run at very low pressures which is highly undesirable in plant scale operations. A further difficulty that is encountered is that water and nitric acid form an azeotrope which contains a low mol percent nitric acid. As the distillation proceeds, the nitric acid in the distillation pot becomes more concentrated, and these conditions further increase the oxidation of the carboxymethyl diether. Yet another disadvantage of low pressure vacuum distillations is that refrigeration equipment is needed to condense and recover the nitric acid and the cost of such equipment makes the process economically unattractive.

It is an object of this invention to provide a process for separating nitric acid from a mixture of nitric acid and a carboxymethyl diether of an ethylene glycol.

Another object of the present invention is to provide a process for economically recovering nitric acid from a mixture of nitric acid and a carboxymethyl diether of an ethylene glycol.

Figure 1:
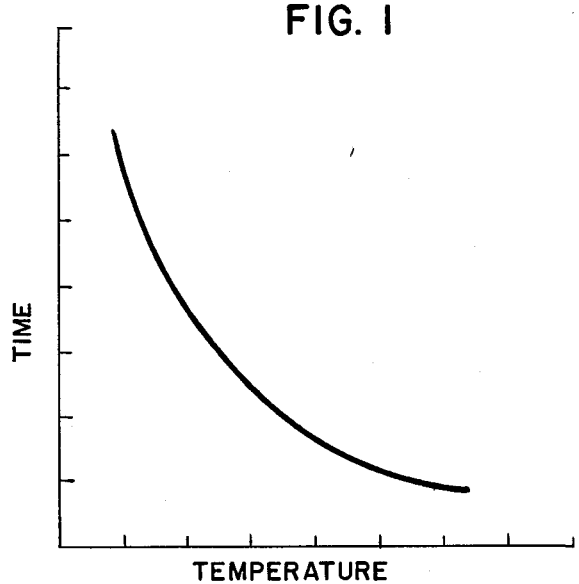

Other objects and advantages of the present invention will become apparent from the following detailed description thereof when read in conjunction with the accompanying drawings in which Fig. 1 is a curve in which the time that a carboxymethyl diether will be stable at a given temperature is plotted against temperature.

Figure 2:
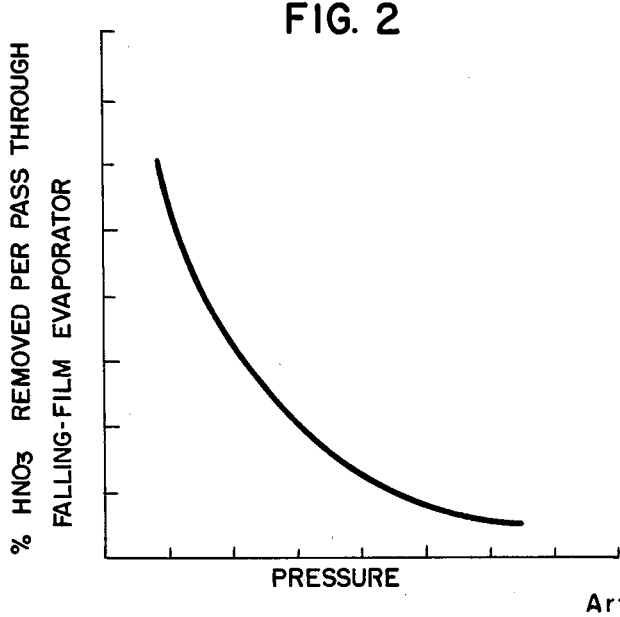
Figure 3:
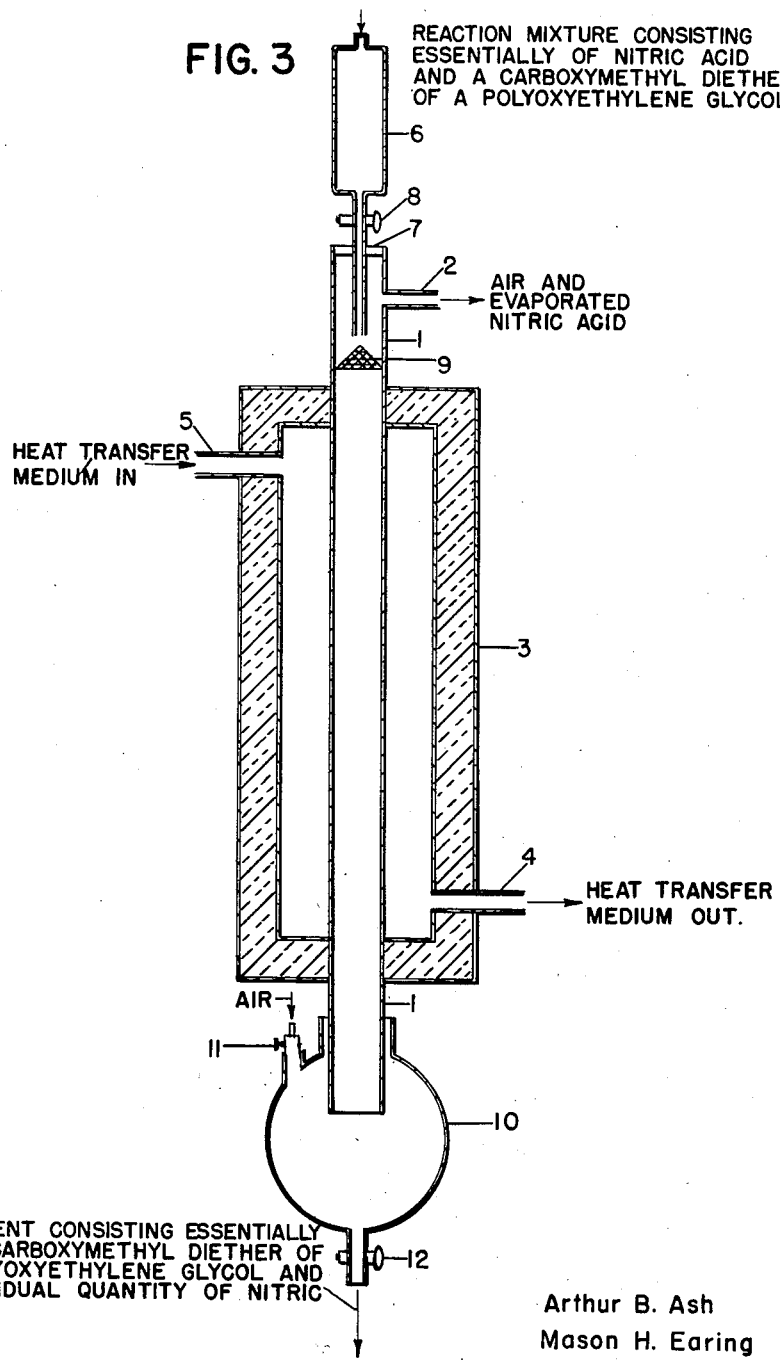

Fig. 2 is a curve in which the percent HNO₃ removed from a mixture of HNO₃ and a carboxymethyl diether of an ethylene glycol per pass through a falling film evaporator at a fixed temperature is plotted against the distillation pressure, and Fig. 3 is a cross sectional view of a falling film evaporator of the type employed in carrying out the separation herein described.

Although conventional distillation techniques are technically unattractive, we have discovered that nitric acid may be readily separated when in admixture with a carboxymethyl diether by vacuum distillation, provided that the distillation is carried out in a falling film type evaporator under carefully controlled conditions. The three critical variables that must be controlled in such falling film distillations are:

1. Contact time
2. Distillation temperature
3. Distillation pressure (ambient pressure)

The term "contact time" denotes the average time that any fixed quantity of carboxymethyl diether is in contact with the heated walls of the falling film evaporator. As used herein, the term "distillation temperature" will be expressly understood to mean the temperature of the heated surface of the distillation apparatus. This temperature will not necessarily be the same as the actual temperature of the carboxymethyl diether since the distillation is carried out under nonequilibrium conditions as will be subsequently described in greater detail.

It has been previously stated that mixtures of carboxymethyl diethers and nitric acid are unstable at temperatures substantially above 60° C., i. e. the carboxymethyl diether is oxidized and becomes highly colored. While the above statement is true, we have discovered that the same mixture is stable at temperatures substantially above 60° C., if the mixture is held at that temperature for a very short period of time. The reason for this seeming anomaly is that the oxidation of the carboxymethyl diether proceeds at a finite reaction rate which is a function of the temperature. The manner in which the time for the development of observable color varies with temperature is illustrated in Fig. 1.

In our novel distillation process, the reaction mixture consisting essentially of a carboxymethyl diether and nitric acid is passed through a falling film evaporator at such a rate that no color develops in the effluent. This throughput rate is described as the contact time and the significance thereof has been previously explained. Numerically, the contact time is expressed in either minutes or seconds, and it has been observed that little or no color develops at contact times of up to 2.0 minutes, when operating at wall temperatures of up to 200° C. and at distillation pressures of between about 50 and 100 mm. Hg.

Since the maximum contact time at which the carboxymethyl diether is stable is short, it is essential that the distillation be carried out under highly efficient evaporating conditions. When the distillation temperature and pressure are set, the evaporation rate will be a direct function of the total surface area per unit weight of carboxymethyl diether in the distillation apparatus. A falling film evaporator is ideal for carrying out this process since the carboxymethyl diether is extenuated into a thin film which has a large surface area per unit of weight, and thus allows a rapid evaporation of nitric acid from the crude reaction mixture. The details of a suitable falling film evaporator will be subsequently described.

Since the maximum permissible contact time is short and because the distillation must be run at relatively low temperatures, i. e. at wall temperatures below 200° C., the distillation must necessarily be run at reduced ambient pressures. Ordinarily, the distillation should be run at pressures below 100 mm. Hg, however, if the nitric acid is to be condensed with 25° C. cooling water, a distillation pressure below 50 mm. Hg should not be used. When the wall temperature, the surface area per unit weight of distillation mixture, and the contact time are held constant, the efficiency of the distillation is a function of pressure as illustrated in Fig. 2 wherein the percent HNO₃ removed from the distillation mixture per pass through the evaporator is plotted against the distillation pressure.

The effect of temperature upon the distillation efficiency is obvious. Although great care must be exercised in selecting the distillation temperatures so as not to oxidize the carboxymethyl diether, when the contact time and distillation pressure are fixed, the distillation temperature should be set as high as feasible without causing undue oxidation of the product. When operating at distillation pressures of 50 mm. Hg or higher and at contact times of 1.0–2.0 minutes in the apparatus subsequently to be described, the distillation can be run at wall temperatures of 150–200° C. without undue oxidation of the carboxymethyl diether.

A falling film evaporator that may be employed in carrying out the present invention is illustrated in Fig. 3. The evaporator consists of a stainless steel pipe 1 having a side arm 2 which leads to a vacuum pump and nitric acid condenser not shown. Pipe 1 is encased in an insulated heating jacket 3 in which is circulated a heat transfer medium through inlet 4 and outlet 5. An addition funnel 6 is mounted in pipe 1 by means of a vacuum packing seal 7. The rate of fluid addition is controlled by a stopcock 8 and the mixture of carboxymethyl diether and nitric acid is discharged from the addition funnel 6 onto a stainless steel wire cone 9 which serves to spread the liquid into a thin film and to distribute it evenly over the interior surface of pipe 1. The interior surface of pipe 1 which lies below cone 9 is lined with stainless steel gauze (not shown) which prevents channeling of the distillation mixture and thereby assures that the liquid will be maintained in a thin even film over the entire interior surface of the pipe. Pipe 1 discharges into an effluent reservoir 10 which contains a bleed valve 11 and a stopcock 12 for emptying the reservoir. Throughout the distillation, bleed valve 11 is opened slightly so there is a constant upward flow of air through pipe 1 to the side arm 2 and the vacuum pump which serves to entrain and remove the nitric acid vapors from the surface of the evaporating mixture and thereby enhance the efficiency of the distillation.

The operating variables that influence the distillation were determined in a falling film evaporator of the type shown in Fig. 3 in which column 1 was a 1 inch I. D. stainless steel pipe, the heated section of which was 40 inches in length. To determine the contact time, it was first necessary to determine the column hold up, i. e. the volume of the distillation mixture required to fill the column. This was determined as follows:

1. A measured volume of carboxymethyl diether-HNO₃ mixture was charged into funnel 6.
2. The temperature of the heat transfer medium in heating jacket 3 was set at 175° C.
3. The pressure of the system was set at 50 mm. Hg.
4. Stopcock 8 was opened to a predetermined setting and a stopwatch was simultaneously started.
5. When the first drop of effluent entered flask 10, stopcock 8 was closed and the stopwatch was stopped.
6. The volume of carboxymethyl diether-HNO₃ mixture remaining in the funnel 6 was determined.

The difference in volume in steps 1 and 6 represents the column hold up of the apparatus. The volume of the column hold up is a function of the interior wall area in the column and the physical characteristics of the distillation mixture. The viscosity of the distillation mixture is the most important physical characteristic that has an influence on the column hold up, and of course this viscosity is a function of temperature. Consequently, the determined volume of the column hold up is only accurate at the temperature specified, however, it has been determined that the wall temperature has only a slight influence on the column hold up over the temperature range of 150–200° C. In theory at least, it is possible that the column through-put rate would have an effect upon the volume of the column hold up, but over a wide range of through-put rates it was determined that the volume of the column hold up was constant within the limits of experimental error. The volume of the column hold up under these conditions was 15.0 ml.

The contact time in minutes, i. e. the average time that any given molecule of the carboxymethyl diether is in the column, is determined by dividing the volume of the column hold up by the rate (in milliliters per min.) at which the carboxymethyl diether-HNO₃ mixture is charged into the column. The effect that contact time has upon the stability of the carboxymethyl diether (as measured by discoloration of the product) is illustrated in Example 1.

EXAMPLE 1

A reaction mixture consisting essentially of nitric acid and a carboxymethyl diether of a polyoxyethylene glycol having the following formula:

$$HOOC-CH_2-O(CH_2-CH_2-O)_n-CH_2-COOH$$

where: $n$ has an average value of 2.2 is obtained by oxidizing 200 grams (1 mol) of a polyoxyethylene glycol of 200 average molecular weight with 567 grams (6 mols) of 67% nitric acid at 45–50° C.

The effect of the contact time on the stability of the carboxymethyl diether was determined by passing the above described mixture through the falling film evaporator of Fig. 3 at contact times varying from 1.0–4.0 minutes with the distillation temperature and distillation pressure being maintained at 175° C. and 50 mm. Hg, respectively. The results are set forth in Table I below:

*Table I*

| Run No. | Distillation Temp., °C. | Distillation Pressure mm. Hg | Contact Time, Minutes | Color Carboxymethyl Diether |
|---|---|---|---|---|
| 1 | 175 | 50 | 1.0 | clear straw. |
| 2 | 175 | 50 | 1.5 | light yellow. |
| 3 | 175 | 50 | 4.0 | dark yellow. |

From Table I, it may be concluded that, at distillation temperatures of 175° C. and distillation pressures of 50 mm. Hg, the carboxymethyl diether develops at most a light yellow color at contact times of up to 2.0 minutes. At contact times in the range of 2.0–4.0 minutes, the carboxymethyl diether develops a dark yellow color but is satisfactory for many applications where color is of secondary importance. When the contact time is increased above about 4 minutes, however, the product becomes brown and is drastically overoxidized as evidenced by an increase in the neutral equivalent value of the product.

When the distillation is run at a fixed temperature and pressure, the efficiency of the distillation is a function of contact time as illustrated in Example 2.

EXAMPLE 2

The carboxymethyl diether-HNO₃ mixture described in Example 1 was passed through the falling film evaporator of Fig. 3 at a distillation temperature and pressure of 175° C. and 50 mm. Hg, respectively, at 2 different contact times. The efficiency of the distillation (as measured by the percent HNO₃ in the effluent) improved with an increase in contact time as illustrated in Table II below:

*Table II*

| Run No. | Distillation Temp., °C. | Distillation Pressure, mm. Hg | Contact Time, Minutes | Percent HNO₃ in Effluent |
|---|---|---|---|---|
| 1 | 175 | 50 | 0.6 | 3.8 |
| 2 | 175 | 50 | 1.5 | 1.2 |

It will be noted that the amount of HNO₃ removed increased when the contact time was increased from 0.6 to 1.5 minutes since the HNO₃ in the effluent product decreased from 3.8 to 1.2%.

The maximum contact time that may be employed without overoxidizing the carboxymethyl diether is a function of the distillation temperature and, consequently, control of the distillation temperature is a critical factor in our distillation process. As set forth in Example 1, contact times of up to 2.0 minutes may be employed at 175° C. without causing serious development of color in the product. When operating at distillation temperatures of 200° C., it is preferable not to employ contact times of more than 1.0 minutes. Above 200° C. the maximum permissible contact time decreases so rapidly that it is inexpedient to use distillation temperatures above 200° C. The quantitative effect of distillation temperature is shown in Example 3.

EXAMPLE 3

When operating at distillation temperatures below 200° C., and at fixed pressures and contact times, the efficiency of the distillation increases at higher temperatures as evidenced by the following results:

The carboxymethyl diether-HNO₃ mixture described in Example 1 was passed through the falling film evaporator of Fig. 3 at a distillation temperature of 160° C. A second portion of the mixture was distilled under identical conditions except that the distillation temperature was increased to 175° C. The operating conditions and the percent HNO₃ in the effluent are shown in Table III below:

*Table III*

| Run No. | Distillation Temp., °C. | Distillation Pressure, mm. Hg | Contact Time, Minutes | Percent HNO₃ in Effluent |
|---|---|---|---|---|
| 1 | 160 | 50 | 1.6 | 6.3 |
| 2 | 175 | 50 | 1.5 | 1.2 |

Referring to Table III, it is seen that the efficiency of the distillation, as measured by the percent HNO₃ in the effluent, increases very rapidly with temperatures under otherwise identical conditions.

The pressure at which the distillation is run is obviously important inasmuch as the distillation temperature can be lowered with the distillation pressure without a loss of distillation efficiency. Theoretically, there is no lower limit on the pressure that may be employed in the distillation. If the preparation of the carboxymethyl diethers is to be economically feasible, however, it is essential that the nitric acid be recovered substantially quantitatively. From economic considerations the nitric acid must be condensed with cooling water which may be as warm as 25° C., consequently, the process must be carried out at a pressure not lower than about 50 mm. Hg. Since vacuums of 50 mm. are easily obtained, it is preferable to run the distillation near this pressure, viz. 50–60 mm. Hg.

At this point it should be pointed out that, in all probability, the distillation is carried out under non-equilibrium conditions. In particular, it will be noted that the term "distillation temperature" has been defined as the wall temperature of pipe 1. The temperature of the carboxymethyl diether flowing down the interior walls of the column is substantially lower than the wall temperature because of the adiabatic cooling effect of the nitric acid vaporization. It is essential that the distillation variables, i. e. contact time, distillation temperature and distillation pressure, be selected so that nitric acid will be evaporated throughout the entire length of the column, thus cooling the carboxymethyl diether. If the distillation variables are selected so that all of the nitric acid is evaporated before the carboxymethyl diether is discharged from the column, there will be no adiabatic cooling in the lower portion of the column and the carboxymethyl diether will overheat and become discolored.

For example, Run 2 of Table III represents substantially ideal conditions in that all but 1.2% HNO₃ was removed from the mixture and the product was a pale straw color. Under identical conditions, except that the distillation pressure was lowered to 10 mm. Hg, the carboxymethyl diether was over-oxidized and badly discolored. The explanation for this seeming anomaly is that all the nitric acid was evaporated in the upper portion of column 1, and that in the lower portion of the column there was no adiabatic cooling, consequently, the product overheated and was badly oxidized. Similarly, if the carboxymethyl diether-HNO₃ mixture is passed through the column at a contact time of approximately 1.0 minute and at atmospheric pressure it is badly discolored because of the absence of adiabatic cooling. These results demonstrate that the distillation variables such as contact time, distillation temperature and distillation pressure are not mutually independent of one another, but they must be selected so that there will be adiabatic cooling through substantially the entire length of the column.

The proper operating conditions may be conveniently selected by the following procedure:

1. Select a pressure at which the distillation is to be run. (Preferably 50–60 mm. Hg.)
2. Determine the column hold up at a temperature of about 150° C., as previously described.
3. Set the distillation temperature at 150° C. and set the pressure at the value determined in (1) above.
4. Feed a carboxymethyl diether-HNO₃ mixture into the column so that a contact time of about 1.0 minute will be obtained.
5. Observe the color of the effluent carboxymethyl diether.
6. Analyze the percent HNO₃ in the effluent carboxymethyl diether.

If these conditions do not give satisfactory results the reaction conditions can be adjusted as indicated. For example, if the color of the carboxymethyl diether is too dark, the contact time should be shortened or the distillation temperature lowered. If the color of the effluent carboxymethyl diether is satisfactory, but the percent HNO₃ is high, the contact time should be lengthened or the distillation temperature raised.

While the process has been described as being carried out in a falling film evaporator, it is obvious that it can be carried out in any low pressure distillation apparatus wherein the distillation mixture is extenuated into a thin film having a large surface area per unit weight of distillation mixture.

What is claimed is:

1. A process for separating nitric acid from a product consisting essentially of a mixture of nitric acid and a carboxymethyl diether of a polyoxyethylene glycol, having the formula:

$$HOOC-CH_2-O(C_2H_4O)_nCH_2-COOH$$

where: $n$ is an integer, which comprises extenuating said mixture into a thin film on a surface heated to 150–200° C., maintaining the ambient pressure at less than 100 mm. Hg, maintaining said film in contact with the heated surface for an average time of not more than 2.0 minutes, removing the film from the heated surface, cooling the liquid and collecting a product which contains therein a smaller proportion of nitric acid; the time in which the mixture is in contact with the heated surface, the temperature of the heated surface and the ambient pressure being simultaneously regulated so as to effect evaporation of nitric acid from said film over substantially the entire area of the film and thereby adiabatically cooling the carboxymethyl diether and preventing substantial oxidation thereof.

2. A process for separating nitric acid from a product consisting essentially of a mixture of nitric acid and a carboxymethyl diether of a polyoxyethylene glycol, having the formula:

$$HOOC-CH_2-O(C_2H_4O)_n-CH_2-COOH$$

where: $n$ is an integer, which comprises passing said mixture through a falling film evaporator at a rate such that the carboxymethyl diether is in contact with the evaporator wall for less than 2.0 minutes and thereafter cooling the liquid and collecting an effluent which contains therein a smaller proportion of nitric acid; maintaining the evaporator wall temperature at 150–200° C. and maintaining the ambient pressure at less than 100 mm. Hg throughout the distillation; the wall temperature, the time in which the mixture is in contact with the heated wall and the ambient pressure being simultaneously regulated so as to effect evaporation of nitric acid from said film over substantially the entire area of the film and thereby adiabatically cooling the carboxymethyl diether and preventing substantial oxidation thereof.

References Cited in the file of this patent

UNITED STATES PATENTS

| | | |
|---|---|---|
| 1,323,075 | Levin et al. | Nov. 25, 1919 |
| 2,609,334 | Pyle | Sept. 2, 1952 |

OTHER REFERENCES

Spence: Ind. and Eng. Chem., vol. 42, pp. 1926–29 (1950.)

Bermer et al.: Ind. and Eng. Chem., vol. 42, pp. 1930–34 (1950.)